United States Patent [19]

Blume et al.

[11] Patent Number: 4,491,294

[45] Date of Patent: Jan. 1, 1985

[54] ADJUSTMENT DEVICE FOR AN OPTICAL WAVEGUIDE

[75] Inventors: Georg Blume, Backnang; Ludwig Franke, Murrhardt, both of Fed. Rep. of Germany

[73] Assignee: ANT Nachrichtentechnik GmbH, Backnang, Fed. Rep. of Germany

[21] Appl. No.: 522,391

[22] Filed: Aug. 11, 1983

[30] Foreign Application Priority Data

Aug. 12, 1982 [EP] European Pat. Off. ........ 82107313.7

[51] Int. Cl.³ .............................................. G02B 5/172
[52] U.S. Cl. ................... 248/251; 248/274; 350/96.20; 74/479
[58] Field of Search ............... 248/274, 251; 350/247, 350/96.20; 356/244, 73.1; 269/60, 71; 74/479; 73/432 A; 308/2 A; 24/569, 135 R, 500, 511

[56] References Cited

U.S. PATENT DOCUMENTS

| 2,869,418 | 1/1959 | Miller | 356/244 |
| 3,124,018 | 3/1964 | Gough | 269/60 |
| 3,525,140 | 8/1970 | Cachon | 269/60 |
| 3,704,846 | 12/1972 | Clark | 248/274 |
| 3,801,090 | 4/1974 | Gillen | 269/60 |
| 4,077,722 | 3/1978 | Bicskei | 350/247 |

FOREIGN PATENT DOCUMENTS

| 245341 | 4/1976 | Fed. Rep. of Germany . | |
| 2124986 | 10/1978 | Fed. Rep. of Germany | 74/479 |
| 13155 | 12/1970 | Japan | 74/479 |
| 372439 | 4/1973 | U.S.S.R. | 73/431 |

*Primary Examiner*—William H. Schultz
*Assistant Examiner*—Robert A. Olson
*Attorney, Agent, or Firm*—Spencer & Frank

[57] ABSTRACT

An adjustment device for supporting and positioning an optical waveguide end portion, composed of: a supporting frame; a spring element supported by the frame for supporting the waveguide end portion; and device associated with the element for applying pressure thereto in two mutually orthogonal directions perpendicular to the axis of the waveguide end portion for positioning the waveguide end portion in a plane perpendicular to the waveguide end portion axis; wherein the spring element is an L-shaped angle piece having two arms meeting at a vertex, with the end of one arm remote from the vertex being fastened to the frame, and the end of the other arm remote from the vertex being arranged to support the waveguide end portion, and a respective one of the pressure applying devices acts on each one of the arms.

8 Claims, 2 Drawing Figures

ADJUSTMENT DEVICE FOR AN OPTICAL WAVEGUIDE

BACKGROUND OF THE INVENTION

The present invention relates to an adjustment device for an optical waveguide disposed in a spring element held in an outer supporting frame, with elements being provided to exert an adjustable pressure on the spring element in two orthogonal directions perpendicular to the axis of the optical waveguide so as to change the position of the optical waveguide in a plane perpendicular to the longitudinal axis of the waveguide.

If an optical waveguide is to be coupled to an optical transmitting or receiving element, a focusing lens or another waveguide, the requirement exists that the optically effective surfaces be aligned with one another as accurately as possible to keep transfer attenuation at a minimum. For this purpose, very precisely operating adjustment devices are required.

German Pat. No. 2,453,413 discloses an adjustment device in which the optical waveguide to be adjusted is disposed in a body made of an elastic material, e.g. rubber. By pressure from various sides to the body accommodated in an outer supporting frame, this body is deformed. The deformation causes the optical waveguide to be displaced in a direction depending on the pressure exerted on the elastic body.

Due to the elastic mass in which the optical waveguide is embedded, there exists only a very indirect contact between the optical waveguide and the pressure dies to be screwed in so as to act on the mass. Therefore, defined positioning of the waveguide by way of the pressure acting on the elastic mass is possible only with difficulty. Moreover, the elastic mass imparts only a conditionally firm position to the waveguide. Primarily there exists the danger that after a long period of time the waveguide will creep out of the adjusted position within the elastic body.

SUMMARY OF THE INVENTION

It is therefore an object of the present invention to provide an adjusting device of the above-mentioned type which can give an optical waveguide a precisely defined, firm position which remains unchanged over long periods of time.

The above and other objects are achieved, according to the invention, by an adjustment device for supporting and positioning an optical waveguide end portion, comprising: a supporting frame; a spring element supported by the frame for supporting the waveguide end portion; and means associated with the element for applying pressure thereto in two mutually orthogonal directions perpendicular to the axis of the waveguide end portion for positioning the waveguide end portion in a plane perpendicular to the waveguide end portion axis; wherein the spring element is an L-shaped angle piece having two arms meeting at a vertex, with the end of one arm remote from the vertex being fastened to the frame, and the end of the other arm remote from the vertex being arranged to support the waveguide end portion, and the pressure applying means acting on each one of the arms.

BRIEF DESCRIPTION OF THE DRAWING

The invention will now be described in greater detail with reference to a preferred embodiment that is illustrated in the drawing.

DESCRIPTION OF THE PREFERRED EMBODIMENTS

Figure 1:
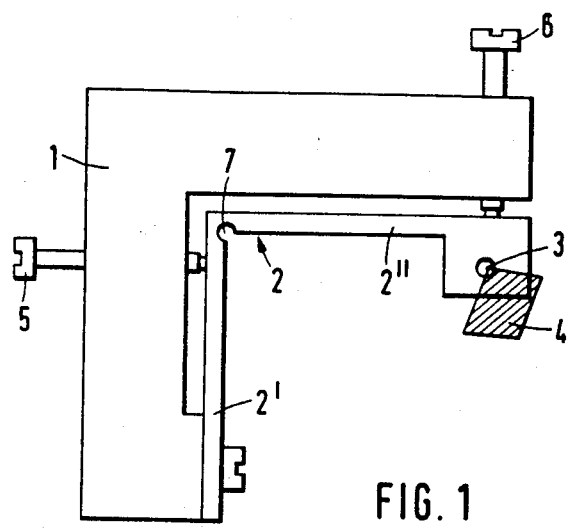
FIG. 1 shows an elevational view of that embodiment.

FIG. 1 shows an adjustment device according to the invention including an L-shaped supporting frame 1 and a resilient angular piece 2 fastened to one arm of supporting frame 1 and likewise having an L shape.

Figure 2:
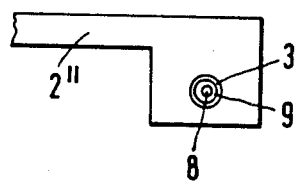
FIG. 2 shows a section of a resilient angle piece accommodating an optical waveguide held in a capillary tube.

The angular piece 2 is composed of two arms 2' and 2". It is firmly connected to the supporting frame at only one point, i.e. essentially at the outermost end of arm 2'. The other arm 2" is provided with a bore 3 at its free end to accommodate an optical waveguide. The optical waveguide may additionally be held in a capillary tube 9 inserted and fixed into the bore 3, as shown in FIG. 2. Due to the fact that the point of fastening, at the end of arm 2', and the receptacle 3 for the optical waveguide are disposed at the most remote points of the L-shaped section, the area 4 over which the frontal face of the optical waveguide can be displaced when one or both arms are bent is a maximum. The size of this area 4, which is shown in hatching in the Figure, depends on the length of arms 2' and 2" and their elasticity.

The deflection of each individual arm can be set by a respective one of two screws 5 and 6 which are threaded in bores extending through supporting frame 1.

It is advisable to dispose screw 5, which presses on the unilaterally fixed arm 2', in the vicinity of the vertex formed by arms 2' and 2", and screw 6, which presses on the other arm 2", at its free end which carries the optical waveguide. This permits optimum adjustment of the optical waveguide with two degrees of freedom.

If the piece 2 is weakened, by removal of material at the vertex 7, and/or if the arms have differences in their elasticity, it results that when arm 2" is deflected by screw 6, the other arm 2' is subjected to almost no bending stress. On the other hand, arm 2" is under a permanent stress relative to arm 2' so that when the latter is deflected toward the right, arm 2" remains in contact with screw 6. That is, it is possible to associate each arm with a positioning step for the optical waveguide in a defined direction, almost independently of the other arm.

Following two examples are given of the angle piece 2 with the arms 2' and 2" which have different elasticities.

EXAMPLE 1

Both arms 2' and 2" are out of the same material, tin-bronze (CuSn 6). The arm 2' which has a thickness of 0.6 mm, a width of 5 mm and a spring-length of 10 mm is less elastical than the arm 2" which has a thickness of 0.2 mm, a width of 3 mm and a spring-length of 10 mm.

EXAMPLE 2

The material of the arm 2' is X12 CrNi 188 with an elasticity modulus of 195 kN/mm$^2$ and the material of the arm 2" is CuSn 6 with an elasticity modulus of 115 kN/mm$^2$.

The weakening recess 7 provided at the vertex of the angle piece 2, shown in FIG. 1, cuts the thickness of the angle piece nearly in half.

The optical transmitting or receiving element, the lens and the optical waveguide with which the waveguide placed in the adjusting device is to be aligned are either fixed in or to supporting frame 1 in a defined position or are supported by an identical second adjustment device whose supporting frame is connected to the frame carrying the waveguide carried by first-mentioned adjustment device.

It will be understood that the above description of the present invention is susceptible to various modifications, changes and adaptations, and the same are intended to be comprehended within the meaning and range of equivalents of the appended claims.

What is claimed is:

1. An adjustment device for supporting and positioning an optical waveguide end portion, comprising: a supporting frame; a spring element supported by said frame for supporting the waveguide end portion; and means associated with said element for applying pressure thereto in two mutually orthogonal directions perpendicular to the axis of the waveguide end portion for positioning the waveguide end portion in a plane perpendicular to the waveguide end portion axis; wherein said spring element is an L-shaped angle piece having two arms meeting at a vertex, with the end of one said arm remote from said vertex being fastened to said frame, and the end of the other said arm remote from said vertex being arranged to support the waveguide end portion, and said pressure applying means act on each one of said arms.

2. Adjustment device as defined in claim 1 wherein said pressure applying means comprise a first pressure applying device engaging at said end of the said other arm which carries said supporting means, and a second pressure applying device engaging at said one arm near said vertex.

3. Adjustment device as defined in claim 2 wherein each said pressure applying device is a screw threaded in a respective passage in said supporting frame.

4. Adjustment device as defined in claim 1 wherein said angle piece is weakened at said vertex.

5. Adjustment device as defined in claim 1 wherein said two arms of said angle piece have respectively different elasticities.

6. Adjustment device as defined in claim 1 wherein said end of said other arm is provided with a bore in which the waveguide end portion is mounted.

7. Adjustment device as defined in claim 6 further comprising a capillary tube mounted in said bore for receiving the waveguide end portion.

8. Adjustment device as defined in claim 1 wherein said pressure applying means comprise two pressure applying screws each threaded in a respective passage in said supporting frame for applying pressure to a respective one of said arms.

* * * * *